Oct. 12, 1954  A. F. HICKMAN  2,691,406
RESILIENTLY MOUNTED SEAT STRUCTURE
Filed March 28, 1952  3 Sheets-Sheet 2

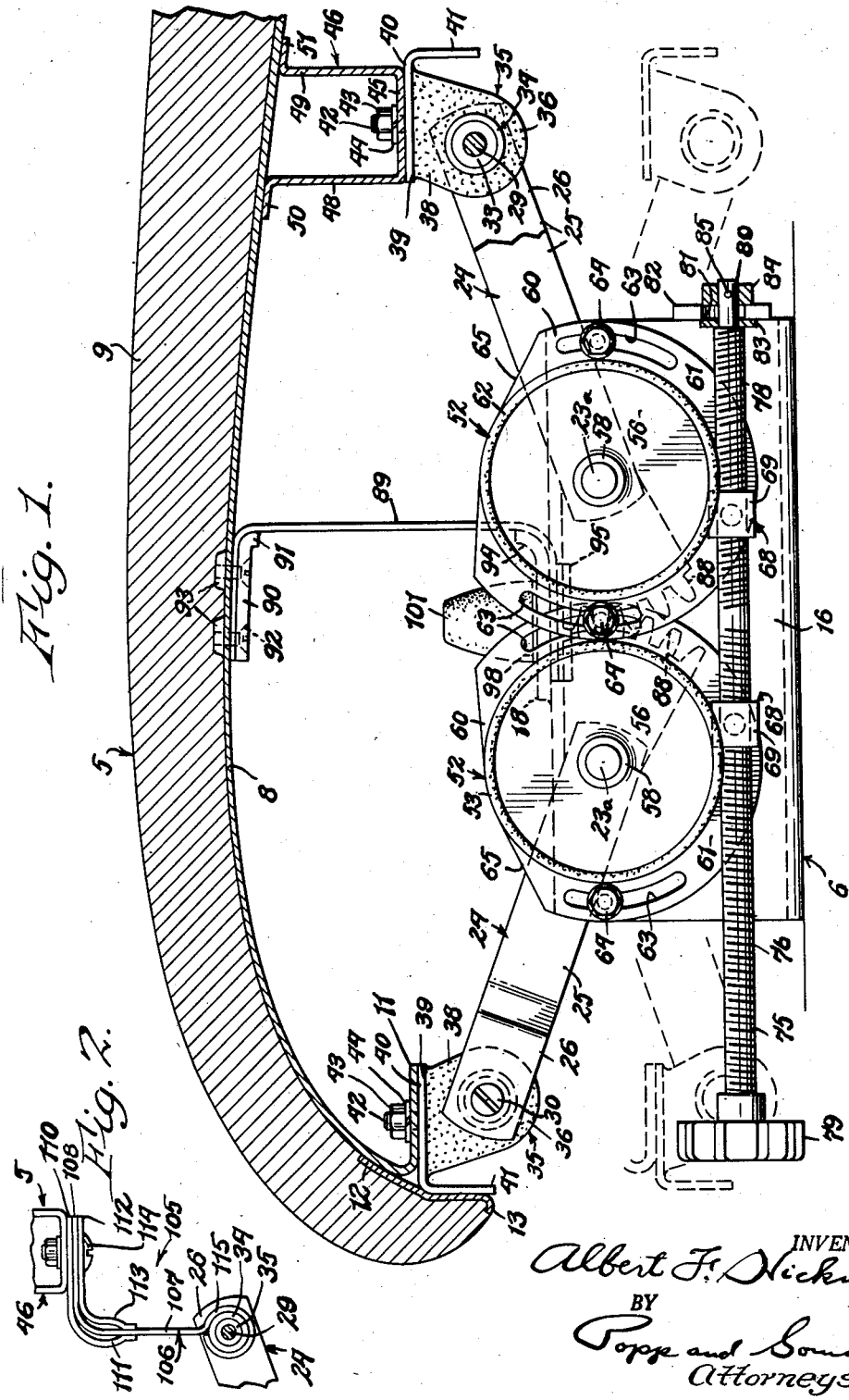
Oct. 12, 1954 — A. F. HICKMAN — 2,691,406
RESILIENTLY MOUNTED SEAT STRUCTURE
Filed March 28, 1952 — 3 Sheets-Sheet 1
INVENTOR.
Albert F. Hickman
BY
Popp and Sommer
Attorneys.

INVENTOR.
Albert F. Hickman
BY
Popp and Sommer
Attorneys.

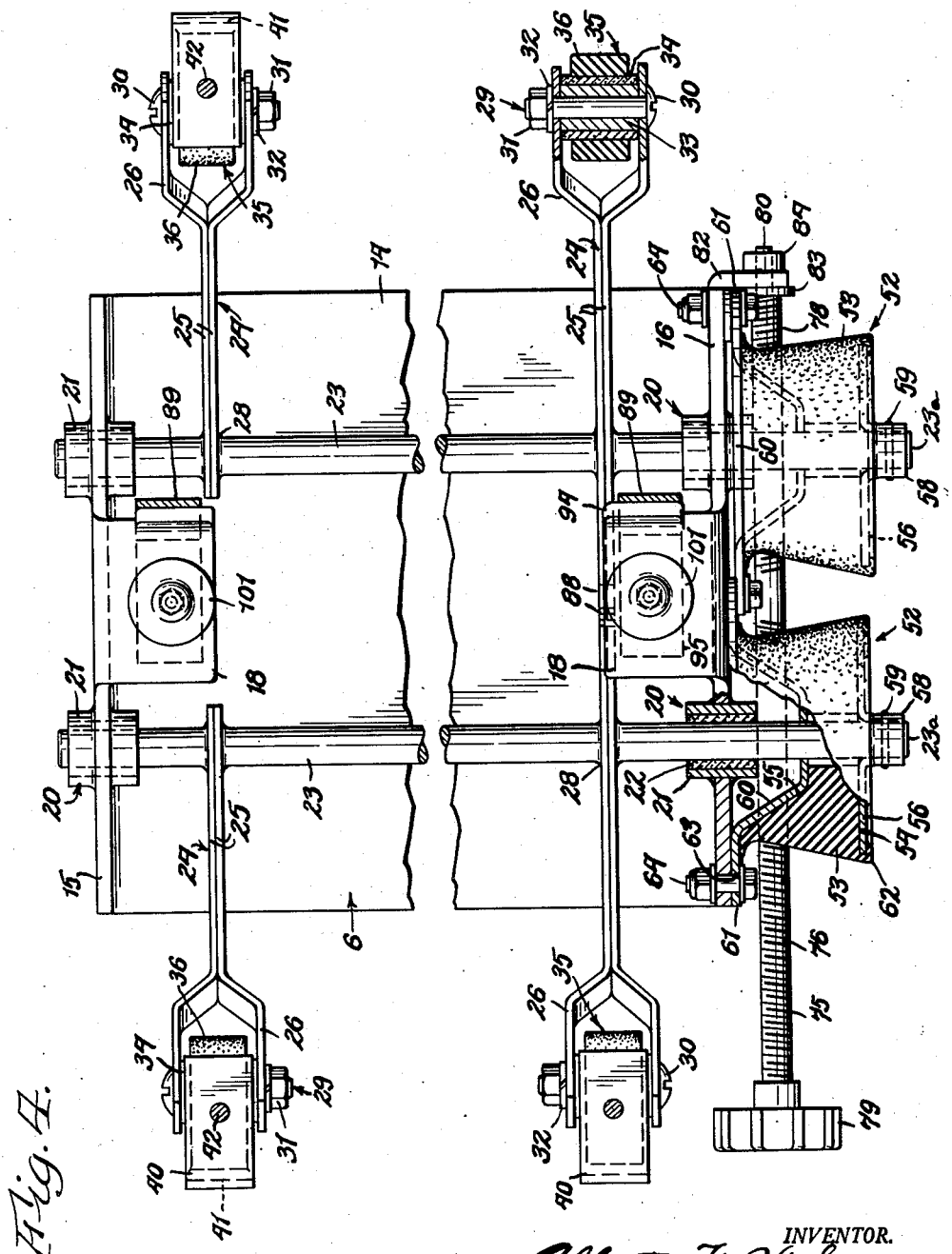

Patented Oct. 12, 1954

2,691,406

UNITED STATES PATENT OFFICE 2,691,406

RESILIENTLY MOUNTED SEAT STRUCTURE

Albert F. Hickman, Eden, N. Y., assignor to Hickman Industries, Inc., Eden, N. Y., a corporation of New York Application March 28, 1952, Serial No. 279,127

8 Claims. (Cl. 155—50)

This invention relates to a seat structure and more particularly to such a seat structure designed for use in the drivers' cabs of highway trucks or other highway vehicles, features of the present invention being also applicable, however, for use with extremely rough riding off the road vehicles such as farm tractors and military vehicles and features also being applicable for use in railroad locomotives.

This application is a continuation in part of my copending applications for Resilient Seat Suspension, Serial No. 746,678, filed May 8, 1947 (now Patent No. 2,590,859, dated April 1, 1952) and Serial No. 120,239, filed August 8, 1949, these applications being primarily directed to seat structures for rough riding off the road vehicles and the present application being directed to seat structures for highway vehicles.

In common with my said copending applications, important objects of the present invention are to provide a seat structure (1) in which the occupant is permitted to move vertically against a geometric resilient resistance relative to the vehicle on which the seat is mounted, (2) in which a degree of resiliently resisted movement of the seat laterally of the vehicle frame is permitted, (3) which provides the maximum safety and comfort and leaves the occupant in full control of all controls of the vehicle, (4) in which the seat moves with the occupant and is not drawn or jerked away from the occupant whenever the pressure imposed by the occupant upon the seat becomes negative, (5) which will operate at a desirable frequency range regardless of the weight of the occupant, (6) which can be designed, within practicable limits, to have any desired frequency and any desired resistance curve, (7) which reduces and cushions vertical and lateral impacts against the occupant without imposing undue thrusts on the connections between the seat part of the seat structure and the vehicle, (8) in which torsion springs are employed to provide a longer and variable spring resistance range, (9) in which the resilient support is provided by torsion springs which are simple, compact, low in cost and have long life and freedom from service difficulties, (10) in which geometric resilient resistance is obtained in a compact structure which requires very infrequent lubrication and is free from noise, (11) in which the load from the seat part to the suspension means and from the suspension means to the base part of the seat structure is distributed at a plurality of spaced points, (12) in which both fore-and-aft lateral tilting of the seat is prevented, (13) which is made of a plurality of low cost and sturdy subassemblies which can be easily coupled together, (14) which is extremely compact and sturdy and which will stand up under conditions of severe and constant use with very little servicing.

A specific object of the present invention is to provide such a seat structure in which the seat part of the seat structure, when unloaded, is at a comparatively low elevation but in which the arrangement of the parts is such that the parts nest together when the seat is fully depressed so as to provide the necessary amount of vertical movement of the seat.

Another specific object is to provide a seat structure in which the seat part is mounted on the ends of crank arms fulcrumed on the base part and in which the articulated connections between the ends of the crank arms and the seat part are such as to securely support the seat part without unwanted lateral movement.

Another specific feature of the invention is the connection of the seat part of the seat structure to crank arms of the suspension means through resilient bodies or connectors which are fixed to the seat part and which flex to permit action of the crank arms. By this means the action of the crank arms is accommodated without employing conventional shackles or shackle assemblies thereby eliminating bearings and also the cost of such shackle assemblies.

Another specific object of the invention is to connect the crank arms to these flexible bodies by sleeve bearings of a size sufficient to provide sufficient friction to eliminate the necessity for a shock absorber.

Another specific object of the invention is to provide limit stops for the movement of the flexible bodies or connectors between the seat part of the seat structure and the crank arms, thereby to limit horizontal movement of the seat part in a corresponding direction.

Another object of the invention is to provide a simple and effective means for adjusting the initial wind-up of the torsion springs and in which two torsion springs are adjusted from a fixed point on the base on which the adjusting mechanism is anchored.

Another specific object of the invention is to provide such an adjustment which is conveniently available from the front of the seat.

Another specific aim of the invention is to provide a simple and effective means for limiting both the upward and downward movement of the seat part with reference to the base part.

Other objects and advantages will appear from the following description and drawings in which:

Fig. 1 is a vertical fore-and-aft section through a seat structure embodying the present invention and taken generally on line 1—1, Fig. 3, with the parts shown in the fully elevated or unloaded condition of the seat, this view also illustrating, in dotted lines, the fully depressed position of the seat.

Fig. 2 is a fragmentary view, similar to Fig. 1, of a modified form of flexible bodied connector between the seat part of the seat structure and the crank arms of the suspension.

Fig. 4 is a horizontal section taken generally on line 4—4, Fig. 3.

Figure 3:
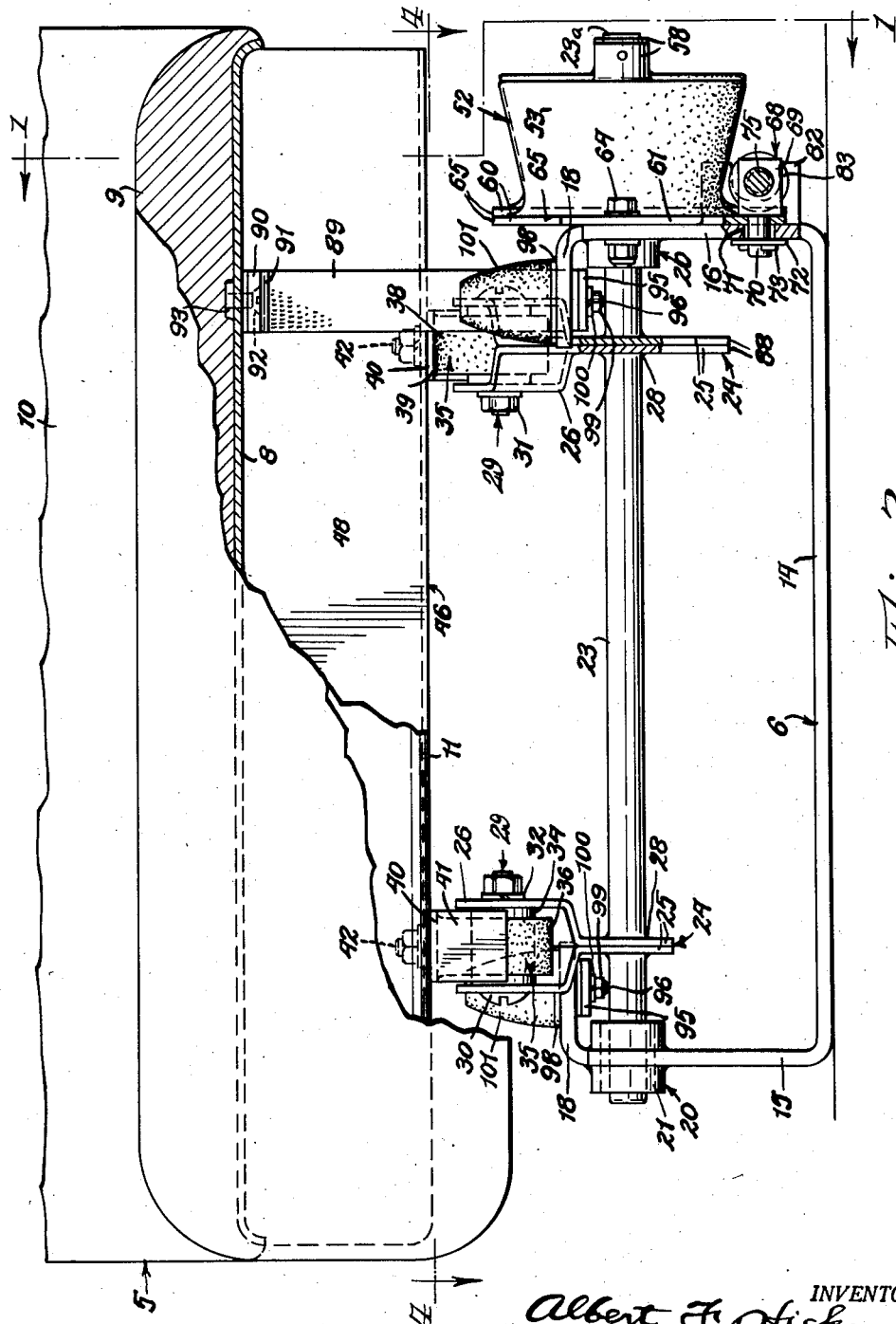
Fig. 3 is a front elevational view of the seat structure with parts broken away to disclose details of the suspension.

The seat structure embodying the present invention is particularly designed for use in the cabs of highway trucks and the like and includes a seat part 5 supported on a base part 6 by a suspension means embodying the present invention. The seat part 5 is shown as comprising a sheet metal bottom plate 8 of suitable contour and upholstered, as indicated at 9, in any suitable manner. At its rear, this sheet metal bottom plate 8 and the upholstering 9 are preferably continued upwardly to form a back part 10. Along its forward edge the sheet metal bottom plate 8 of the seat part 5 is preferably bent to form a rearwardly projecting horizontal flange 11. The seat upholstery 9 is preferably continued beyond this flange 11 and is supported by an extension piece 12 of the sheet metal bottom plate 8 of the seat part and which can be welded to the sheet metal bottom plate 8 and is shown as having a bead 13 at its lower end in which the upholstery 9 terminates.

The base part 6 is shown as being in the form of a generally rectangular metal plate 14 having upwardly extending side walls 15 and 16, and these side walls being formed near their centers with inwardly projecting flanges 18.

Each of the side walls 15, 16, of the base part 6 carries a pair of bearings indicated generally at 20, these being arranged in a generally horizontal plane is spaced fore-and-aft relation to each other and with each bearing 20 on the side wall 15 alining with a companion bearing 20 in the side wall 16. Each of these bearings is shown as being in the form of an outer metal sleeve 21 extending through its side wall 15 or 16 and welded thereto and carrying a bearing bushing 22. Each bearing bushing 22 is preferably made of sintered metal and impregnated with a lubricant so as to require little servicing. Each alined pair of bearings 20 of the side walls 15, 16 carries a fulcrum rod 23, each of these fulcrum rods extending a substantial distance outwardly from the side wall 16 as indicated at 23a. Between the side walls 15, 16 of the base part 6 a pair of crank arms 24 are welded to each of the fulcrum rods 23, each pair of these crank arms on either fulcrum rod being arranged in spaced relation to each other and being arranged parallel with each other and to project in the same direction fore-and-aft of the seat. The crank arms 24 of the rear fulcrum rod 23 project rearwardly, and the crank arms 24 of the front fulcrum rod 23 project forward.

Each of these crank arms 24 comprises a pair of counterpart metal bars 25, 25 arranged in face to face relation and with their outer ends offset laterally with reference to each other to provide a fork 26. The inner ends of these counterpart bars 25 are provided with holes through which the corresponding fulcrum rod 23 extends and these bars are preferably secured to these fulcrum rods by weldments 28 around the fulcrum rod. The fork 26 at the outer end of each crank arm 24 carries a bolt 29 the head 30 of which bears against one arm of the fork and the nut 31 and lock washer 32 of which bears against the other arm of this fork. Each bolt extends through an inner metal bearing sleeve 33 which also forms a spacer for the arms of the companion fork 26 as best shown in Fig. 4. On each of these inner cylindrical metal bearing sleeves 33 is journalled a bearing bushing 34 which is also preferably made of sintered metal and impregnated with a lubricant so as to reduce servicing requirements. Each of the these sintered metal bearing bushings 34 also preferably contacts the arms of its fork 26 at its opposite ends so as to act as a thrust bearing but these bushings 34 are not necessarily clamped between the arms of the forks 26, it being merely necessary to prevent axial displacement of these bushings. To the exterior of each of these sintered metal bearing bushings 34 is secured a flexible bodied connector shown as being in the form of a rubber body 35 which is vulcanized to and embraces the bearing bushing so that the bearing bushing is imbedded therein. This rubber body is shown as having a lower semi-cylindrical part 36 concentric with the bearing bushing 34 and an upward extension 38 which is rectangular in cross section and terminates in an upper horizontal face 39. This upper horizontal face 39 of each flexible bodied connector or rubber body 35 is vulcanized to the under face of a bracket 40 one side of which is bent downwardly so as to provide a stop flange 41 arranged parallel with the axis of the adjacent bearing. At the rear of the seat each of these stop flanges 41 is arranged in rear of the rubber body 35 and at the front of the seat each of these stop flanges 41 is arranged in front of its rubber body 35.

Each of these brackets 40 is provided with a central upstanding threaded stud 42 carrying a nut 43 and lock washer 44. At the front of the seat structure each threaded stud 42 extends upwardly through the horizontal flange 11 of the sheet metal bottom plate 8 of the seat part 5 and its nut and washer 43, 44 bear downwardly against the upper face of this flange. At the rear of the seat structure the threaded studs 42 extend upwardly through the cross part 45 of a metal channel 46 which extends transversely of the seat structure and preferably substantially the full width of the seat part 5 thereof so as to strengthen the seat part 5. The upstanding sides 48, 49 of this channel are each flanged at their upper ends, as indicated at 50 and 51 and these flanges are preferably welded to the underside of the sheet metal bottom plate 8 of the seat part 5.

The resilient support for the suspension means is shown as being in the form of a pair of rubber torsion springs indicated generally at 52 and each of which is shown as being secured to the end 23a of a companion fulcrum rod 23 which projects beyond the side wall 16 of the base part 6. Each of these rubber torsion springs can be of any suitable construction and is shown as comprising a frusto-conical body 53 of rubber having a flat outer face 54 and a concave inner face 55. To the outer flat face 54 of each rubber body 53 is vulcanized a metal disk 56 having a hub 58 which fits the extremity 23a of the corresponding fulcrum rod 23 and can be secured thereto in any suitable manner as by the cross pin 59. To the opposite concave face 55 of each rubber body is vulcanized a conforming convex metal anchoring member or plate 60, this anchoring plate having an outwardly projecting marginal flange 61. For protection, the outer edge of each rubber body 53 preferably curls around and is vulcanized to the outer face of the disk 56 as indicated at 62.

Each rubber spring is attached to the side wall 16 of the base part 6 to hold the torsion spring against axial displacement and for this purpose its outwardly projected marginal flange 61 is provided, preferably on diametrically opposite sides of the rubber body 53, with a pair of arcuate slots 63 which are arranged concentric with the axis of rotation of the companion rubber body 53. Bolts 64 extend through each of these arcuate slots 63 and also extend through bolt holes provided in the adjacent side wall 16. At the center of this seat structure the inner arcuate slots 63 of the two rubber springs 52 coincide and one bolt 64 extends through both of these slots. These slots 63 and bolts 64 are primarily to prevent fore-and-aft displacement of the rubber springs 52 with reference to the side wall 16 of the base part on which they are mounted. These bolts 64 can also be tightened to secure the convex anchoring plates 60 of each rubber spring 52 in the desired adjusted position but this is not an essential function of these bolts 64 and if desired these bolts 64 could be in the form of headed stud pins projecting from the side wall 16 through the arcuate slots 63 and unprovided with nuts or lock washers as shown.

The top of each of the flanges 61 of each convex metal anchoring plate 60 is preferably cut away, as indicated at 65, to permit lowering of the seat part 5 fully to the dotted line position shown in Fig. 1.

To permit the ready adjusting of both of the rubber springs 52 to have the same initial degree of windup, these rubber springs are preferably interconnected so as to rotate in unison in making this adjustment. For this purpose a swivel pin 68 is mounted in the lower part of the flange 61 of each convex metal anchoring plate 60 of each rubber spring to rotate about a horizontal axis parallel with the axis of its rubber spring. Each of these swivel pins 68 has a square head 69 disposed against the outer face of the flange 61 of its rubber spring 52 and has a shank 70 extending through an arcuate slot 71 in the side wall 16 of the base part 6, this slot having sufficient clearance, as shown in Fig. 3, to permit sliding movement of this shank along this slot. The swivel pin is shown as secured to the flange 61 of its convex metal anchoring plate 60 by a washer 72 and cotter pin 73, the washer having sliding engagement with the inner face of the side wall 16 of the base part 6. It will be seen that with this construction the swivel pins 68 are severally secured to the flanges 61 of the rubber springs 52 and that they are free to move with the rotation of the convex metal anchoring plates 60 of these rubber springs to the degree permitted by the slots 63 for the bolts 64.

In the square heads 69 of the several swivel pins 68 are screwed a threaded adjusting rod 75 which extends fore-and-aft of the seat structure. The threads 76 at one end of the adjusting rod 75 and threadedly engaging the corresponding swivel pin head 69 are pitched in the opposite direction from the threads 78 in the opposite end of this adjusting rod. This adjusting rod extends forwardly from the base part 6 of the seat structure and at its forward end has fixed thereto a hand knob 79 which is conveniently located immediately under the forward extremity of the seat part 5 of the seat structure. The rear end of this adjusting rod is reduced, as indicated at 80, and extends through a notch 81 provided in a notched plate 82 which is welded to the rear extremity of the side wall 16 of the base part 6. This notch 81 is of sufficient height, as best shown in Fig. 1, to permit the necessary vertical movement of the adjusting rod 75 when adjusting the degree of windup of the rubber springs 52. A washer 83 is placed on the reduced end 80 against the shoulder formed by the threaded part 78 of the adjusting rod and bears against the forward face of the notched plate 82. A retaining collar 84 on the reduced end 80 bears against the opposite or rear face of the notched plate 82 and is secured to the adjusting rod 75 by a pin 85. It will be seen that while this connection at the rear of the adjusting rod 75 permits vertical movement thereof, fore-and-aft movement of this adjusting rod is prevented. Accordingly in adjusting the rubber springs, the swivel pins 68 are moved toward or away from each other to adjust the degree of windup of the rubber springs 52 but these springs are anchored against turning relative to each other by reason of the notched plate 82 preventing longitudinal movement of the adjusting pin 75.

To prevent forward tipping or lurching of the seat part 5, the two fulcrum shafts 23 are geared together so as to rotate in unison. The gearing connecting these two fulcrum shafts 23 is shown as being in the form of intermeshing gear segments 88 formed as extensions of the bars 25 forming the pair of crank arms 24 near the side wall 16 of the base part 6. These gear segments insure that the rotation of either fulcrum rod or shaft 23 effects an equal and opposite rotation of the other fulcrum rod or shaft 23, thereby insuring that the downward movement of, say, the rear part of the seat part 5 will result in a corresponding movement of the front part thereof.

It is also desirable to have a stop to limit the upward movement of the seat part 5 relative to the base part 6 of the seat structure. This accomplished by a pair of straps 89 the upper end of each of which is clamped to the underside of the metal bottom plate 8 of the seat part 5 by a clamping plate 90 having a downturned lip 91 accommodating the right angle bend of the upper end of the strap 89. These clamping plates 90 are arranged at opposite sides near the fore-and-aft center of the seat part 5 and each is shown as secured by a pair of screws 92 which extend through the metal bottom plate 8 and anchor in nuts 93 welded to the upper side of this sheet metal bottom plate 8.

The lower end of each strap 89 is clamped to the under face of the ear or flange 18 which projects inwardly from the upper edge of the corresponding side walls 15 and 16 of the base part 6, these horizontal ears being thereby in opposed relation to each other. Each strap 89 extends under its ear 18 and each ear is provided with an upturned lip 94 accommodating the right angle bend of the lower end of its strap 89. Each strap is clamped to the underside of its ear 18 by a two piece clamping plate 95 and each clamping plate 95 is secured to its ear by a bolt 96 extending through the horizontal ear 18, strap 89 and two piece clamping plate 95. The head of each of these bolts 96 is in the form of a large flat disk 98 which rests on the corresponding ear 18 and the nut 99 and lock washer 100 of each of these bolts 96 tighten against the underside of the two piece clamping plate 95.

On each disk 98 is vulcanized an upstanding rubber bumper 101 which engages the corresponding upper clamping plate 90 when the seat part 5 is fully depressed to the dotted line position shown in Fig. 1. It will therefore be seen that the straps 89 limit the upward movement and the rubber bumpers 101 limit the downward movement of the seat part 5 relative to the base part 6 and that common parts are employed for these two limiting means.

In the operation of the seat structure, which is shown in its unloaded or extreme elevated position in full lines with the fully depressed position illustrated by dotted lines in Fig. 1, the downward movement of the seat part 5, through the flexible rubber bodies 35, swings the free or bifurcated ends 26 of the crank arms 24 downwardly, the fulcrum rods 23 of these crank arms oscillating in their bearings 20. These bearings are secured to the upstanding side walls 15, 16 of the sheet metal bottom plate 14 of the base part 6.

The rotation of each fulcrum rod 23 is yieldingly resisted by the pair of rubber springs 52 severally connected to the projecting ends 23a thereof, this movement of each fulcrum rod 23 being transmitted from its projecting end 23a to the outer end of the corresponding rubber body 53 through the pin 59, hub 58, and disk 56 vulcanized to the outer face of the rubber body. The other end of each rubber body 53 is anchored to the convex anchoring plate 60 vulcanized to its inner concave face 55, and through the marginal flange 61 of this plate 60 the rotative force of each rubber body 53 is transmitted through the corresponding swivel pin 68 to the adjusting screw 75. Since the fulcrum rods 23 and rubber bodies 53 are oscillated in reverse directions relative to each other, these rubber bodies act in reverse directions against the adjusting screw 75 and hence cancel out. The adjusting screw is also held against longitudinal movement with reference to the base part 6 by its washer 83 and collar 84 which embrace opposite sides of the notched plate 82 and hence the convex anchoring plates 60 of the two rubber springs 52 are in effect anchored to the sheet metal base part 14 since the forces transmitted by the rubber bodies 53 to the adjusting screw 75 are lengthwise of this adjusting screw. In addition, if desired, the bolts 64 can be tightened to secured the convex metal anchoring plates 60 directly to the side wall 16 of the base part 6 although the essential function of these bolts is to prevent endwise displacement of the rubber springs 52 and their fulcrum rods 23 and crank arms 24 and for which purpose these bolts 64 could be in the form of headed pins loose in the slots 63.

With the strap 89 limiting the upward movement of the seat part 5 and with the bolts 64 loosened, or with such headed pins in lieu thereof, the initial tension or windup of the two rubber springs 52 can be adjusted by turning the knob 79 of the adjusting screw 75 so as to spread or contract the two swivel pins 68 in the heads 69 of which the reversely threaded ends of the adjusting screw 75 are secured. Such turning of the adjusting rod 75 operates to rotate the flanges 61 of the convex anchoring plates 60 of the two rubber springs 52 in opposition to the strap 89 and hence permits of adjusting the anchoring plates 60 of these rubber plates simultaneously and equally to provide the desired initial tension or windup of the rubber bodies 53. Thus it will be seen that when the threaded rod 75 is turned in one direction, the unattached or unanchored anchoring plate 60 of the rear or right hand rubber spring is turned counterclockwise, and the unattached anchoring plate 60 of the front or left hand rubber spring is turned clockwise. Through the rubber bodies 53, plates 56, rock shafts 23a, arms 24, pins 29, and rubber shackles or bodies 35, this tends to push the seat part 5 upwardly but since the strap 89 limits upward movement of the seat part 5, after this strap has been drawn taut, this adjustment of the threaded rod 75 merely serves to increase the prestress or "windup" in the rubber bodies 53 so that these rubber bodies offer increased resistance to the seat part 5 being pushed down as by one sitting on it. Accordingly the effective resistance of the rubber springs can be easily adjusted.

Fore-and-aft tipping of the seat part 5 is prevented by the gearing interconnecting the crank arm fulcrum rods 23. These fulcrum rods are compelled to oscillate in unison through the segmental gears 88 which interconnect the same. Since the front and rear crank arms 24, 24 are connected by the rubber bodied flexible connectors 35 with the front and rear, respectively, of the seat part 5, it will be seen that this seat part is prevented from fore-and-aft tipping or lurching by so compelling the fulcrum rods 23 to oscillate in unison.

It will also be observed that the seat part 5 is also capable of a degree of lateral movement with reference to the base part 6. Thus, as shown in Fig. 4, the sides of the rubber bodies 35 are spaced from the forked ends 26 of the crank arms 24 so as to permit such lateral movement.

It will also particularly be noted that the rubber bodies 35 are fixed at their upper ends to the seat part 5 and that their ability to accommodate the spreading and contracting of the ends of the opposite crank arms 24 as the seat part falls and rises is a function of the bushings 34. This feature of flexible bodied connectors at the ends of the crank arms 24 and rigidly connected to the seat part 5, or, if inverted, the base part 6, is an important feature of the present seat structure. Thus, if shackles were substituted for all these flexible bodied connectors 35 as taught by the said applications of which this is a continuation in part, it will be seen that in the present seat structure the part 5 would merely flop over forwardly or rearwardly on such assumed shackles and that the suspension means would be inoperative.

When the seat part 5 is so forced downwardly relative to the base part 6, or conversely, when the base part 6 is forced upwardly relative to the seat part 5, the effective opposing force of the rubber springs 52 increases at a geometric and not an arithmetic rate. In this particular case the geometric rate is of the accelerated decrease type in which increments of vertical movement of the seat part are opposed by a decelerated rate of increase of resilient resistance. This is due to the progressive increase in the effective leverage of the crank arms 24 as they swing downwardly and outwardly about their fulcrum rod axes of rotation. This action is also influenced by the fact that increments of vertical displacement of the outer ends of the crank arms cause accelerated rates of decrease in the angular displacement of the rubber torsion springs 52. This latter is due to the fact that increments of vertical movement of the outer ends of the crank arms 24 are not proportional to the accompanying increments of angular twist to which the rubber springs are subjected.

This geometric action also occurs when the base part 6 moves downwardly relative to the seat part 5. Throughout this particular movement the geometric action is of the accelerated increase type, that is, as the base part 6 passes through increments of downward movement the rate of increase of the resilient force tending to pull the seat part downwardly increases.

By this means, so far as vertical forces are concerned, the seat part 5 is free to "float" along solely under the influence of gravity (plus whatever vertical momentum forces are present), this feature being of particular significance when it is realized that the occupant is also, at this time, solely under the influence of gravity (plus whatever vertical momentum forces are present). The consequence is that within this particular range of movement the occupant of the seat moves vertically up and down with the same acceleration and deceleration as the seat part 5 and hence without changing the pressure between the occupant and the seat. Such a desirable result is quite different from that obtained from conventional seat suspension means in which the vehicle drags or jerks the seat down whenever the strains imposed on the seat part are negative. With the present suspension means no such forces tending to pull the seat downwardly are possible.

It will be noted that downward movement of the seat part 5 is positively but yieldingly limited by the rubber bumpers 101, that upward movement of the seat part 5 is positively limited by the straps 89 and that fore-and-aft movement of the seat part 5 is positively but yieldingly limited by the depending flanges 41 of the anchoring plates 39 for the flexible bodied connectors 35, these limiting the forward movement of the rear connector 35 and the rearward movement of the front connector 35. The permitted lateral movement of the seat part 5 is also limited by the spacing of each of these flexible bodied connectors 35 from the arms of the forks 26 at the outer ends of the crank arms 24 and which embrace these flexible bodied connectors.

In the modified form of the invention shown in Fig. 2, the rubber flexible bodied connector 35 at the free or outer end of each crank arm is replaced by a flexible bodied connector 105 made of metal spring leaves. Thus each flexible bodied connector 105 is in the form of a central L-shaped spring 106 having a horizontal part 108 disposed under the seat part cross channel 46 if the connector is at the rear of the seat structure, or disposed under the flange 11 if the connector is at the front of the seat structure. Each central leaf spring 106 has a vertical depending part 107 and is flanked on its opposite sides by L-shaped backing springs. One of these backing springs has a horizontal part 110 arranged above the horizontal part 108 of the central leaf spring and a depending part 111 which extends along the corresponding side of the depending part 107 of the central leaf spring in spaced relation thereto except at its lower extremity where the depending parts 107 and 111 are in contact. Similarly the other backing spring has a horizontal part 112 arranged below the horizontal part 108 of the central leaf spring and a depending part 113 which extends along the corresponding side of the depending part 107 of the central leaf spring in spaced relation thereto except at its lower extremity where the depending parts 107 and 113 are in contact.

The horizontal parts 108, 110 and 112 of the leaf springs are fixed to the seat part 5 by bolts 114 and the lower extremity of the central leaf spring 106 is bent to provide a cylindrical loop 115. This loop embraces the sintered metal, lubricant impregnated bushing 34 which is journalled on the bearing sleeve 35 and which latter is carried by the bolt 29 between the arms of the fork 26 at the free end of a corresponding crank arm 24.

It will be seen that the function of the flexible bodied connectors 105, made of spring leaves as shown in Fig. 2, is the same as the function of the rubber bodies 35 shown in Figs. 1, 3 and 4 and that these two types of flexible bodied connectors can be used interchangeably.

In both forms of the invention resilient support is provided by simple and sturdy rubber torsion springs which can be produced at low cost and are secured to the base part and also to the fulcrum rod shafts in a simple and effective manner and in a position where they are readily accessible. Further, the seat structure as a whole can be readily designed to have any desired characteristics within an operative range. Thus, any desired resistance curve can be obtained by making the crank arms 24 of a corresponding length and any desired frequency can be obtained by selecting a rubber spring of such diameter as to provide the angular crank arm movement to provide such desired frequency. The use of the rubber springs 52 in the form shown and in the seat structure as shown provides the ability to produce any desired spring rate and resistance curve in a very simple and inexpensive seat suspension.

From the foregoing it will be seen that the present invention provides a seat structure which can be designed to have a wide range of characteristics particularly to have such characteristics as to produce the maximum safety and comfort and leave the occupant in full control of all control levers and wheels. The seat structure is also simple, rugged and not subject to breakdown or loss of utility and can be produced at low cost and accomplishes the general and specific objectives enumerated in a simple and efficient manner.

I claim:

1. A seat structure, comprising a seat part, a base part, a pair of generally horizontal, generally parallel spaced fulcrum rods journalled in one of said parts, at least one normally generally horizontal crank arm fixed to each of said fulcrum rods and projecting in a direction opposite to the crank arm of the other fulcrum rod, a member fixed to the other of said parts and projecting toward said one of said parts, a pivot joint between said member and the free end of one of said crank arms, a member movably connecting the free end of the other crank arm with the other of said parts and moved as said seat part moves vertically relative to said base part, at least one of said members being flexible bodied, and means yieldingly resisting vertical movement of said seat part relative to said base part.

2. A seat structure, comprising a seat part, a base part, a pair of generally horizontal, generally parallel spaced fulcrum rods journalled in one of said parts, at least one normally generally horizontal crank arm fixed to each of said fulcrum rods and projecting in a direction opposite to the crank arm of the other fulcrum rod, a member fixed to the other of said parts and projecting toward said one of said parts, a pivot joint between said member and the free end of one of said crank arms, a member movably connecting the free end of the other crank arm with the other of said parts and moved as said seat part moves vertically relative to said base part, at least one of said members being flexible bodied, and means yieldingly resisting vertical movement of said seat part relative to said base part, comprising a rubber torsion body fixed to said one of said parts generally concentric with a corresponding fulcrum rod, and means operatively connecting one part of each rubber torsion body with its fulcrum rod.

3. A seat structure, comprising a seat part, a base part, a pair of generally horizontal, generally parallel spaced fulcrum rods journalled in one of said parts, at least one normally generally horizontal crank arm fixed to each of said fulcrum rods and projecting in a direction opposite to the crank arm of the other fulcrum rod, a member fixed to the other of said parts and projecting toward said one of said parts, a pivotal connection between said member and the free end of one of said crank arms, a flexible bodied connector fixed to the other of said parts and projecting toward the free end of the other of said crank arms, means connecting the free end of said other of said crank arms with said flexible bodied connector whereby said flexible bodied connector is flexed as said seat part moves vertically relative to said base part, and means yieldingly resisting vertical movement of said seat part relative to said base part.

4. A seat structure, comprising a seat part, a base part, a pair of generally horizontal, generally parallel spaced fulcrum rods journalled in one of said parts, at least one normally generally horizontal crank arm fixed to each of said fulcrum rods and projecting in a direction opposite to the crank arm of the other fulcrum rod, a member fixed to the other of said parts and projecting toward said one of said parts, a pivotal connection between said member and the free end of one of said crank arms, a flexible bodied connector fixed to the other of said parts and projecting toward the free end of the other of said crank arms, means connecting the free end of said other of said crank arms with said flexible bodied connector whereby said flexible bodied connector is flexed as said seat part moves vertically relative to said base part, means yieldingly resisting vertical movement of said seat part relative to said base part, and a stop on said other of said parts and limiting the degree of flexure of said flexible bodied connector in at least one direction thereby to limit the vertical movement of said seat part relative to said base part in a corresponding direction.

5. A seat structure, comprising a seat part, a base part, a pair of generally horizontal, generally parallel spaced fulcrum rods journalled in one of said parts, at least one normally generally horizontal crank arm fixed to each of said fulcrum rods and projecting in a direction opposite to the crank arm of the other fulcrum rod, a member fixed to the other of said parts and projecting toward said one of said parts, a pivot joint between said member and the free end of one of said crank arms, a rubber body fixed to the other of said parts and projecting toward the free end of the other crank arm, a bearing bushing embedded in said rubber body, a pivot pin at the free end of said other crank arm and journalled in said bearing bushing whereby said rubber body is flexed as said seat part moves vertically relative to said base part, and means yieldingly resisting vertical movement of said seat part relative to said base part.

6. A seat structure, comprising a seat part, a base part, a pair of generally horizontal, generally parallel spaced fulcrum rods journalled in one of said parts, at least one normally generally horizontal crank arm fixed to each of said fulcrum rods and projecting in a direction opposite to the crank arm of the other fulcrum rod, a plurality of flexible bodied connectors fixed to the other of said parts and each projecting toward the free end of a corresponding crank arm, means connecting the free end of each crank arm with the corresponding flexible bodied connector whereby said flexible bodied connectors are flexed as said seat part moves vertically relative to said base part, and means yieldingly resisting vertical movement of said seat part relative to said base part.

7. A seat structure, comprising a seat part, a base part, a pair of generally horizontal, generally parallel spaced fulcrum rods journalled in said base part and each having at least one normally generally horizontal crank arm projecting in a direction opposite to the crank arm of the other fulcrum rod, a plurality of flexible bodied connectors fixed to said seat part and each projecting toward the free end of a corresponding fulcrum rod, a bearing pivotally connecting the free end of each crank arm with the corresponding flexible bodied connector whereby said flexible bodied connectors are flexed as said seat part moves vertically relative to said base part, and means yieldingly resisting vertical movement of said seat part relative to said base part.

8. In a seat structure having a seat part, a base part, a pair of horizontal, generally parallel spaced fulcrum rods journalled in one of said parts, at least one normally horizontal crank arm fixed to each of said fulcrum rods and projecting in a direction opposite to the crank arm of the other fulcrum rod, and means connecting the free ends of said crank arms with the other of said parts and including at least one movable member, the combination therewith of means resiliently restraining movement of said fulcrum rods, comprising a plurality of rubber torsion bodies, means connecting one part of each rubber torsion body with one of said fulcrum rods, an anchoring plate fixed to another part of each rubber body, a swivel pin on each of said anchoring plates and swinging about an axis generally parallel with said fulcrum rods, an adjusting screw having reversely threaded ends each screwed into a corresponding swivel pin to extend transversely of said swivel pins, and means on said one of said parts and holding said adjusting screw against longitudinal movement.

References Cited in the file of this patent

UNITED STATES PATENTS

| Number | Name | Date |
|---|---|---|
| 870,692 | Shepard | Nov. 12, 1907 |
| 2,467,721 | Arila | Apr. 19, 1949 |